(12) United States Patent
Tanaka

(10) Patent No.: US 10,324,669 B2
(45) Date of Patent: Jun. 18, 2019

(54) ELECTRONIC APPARATUS PROVIDING VOICE ASSISTANCE BASED ON USER INFORMATION

(71) Applicant: Hiroyuki Tanaka, Fukuoka (JP)

(72) Inventor: Hiroyuki Tanaka, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/984,862

(22) Filed: May 21, 2018

(65) Prior Publication Data
US 2018/0335986 A1    Nov. 22, 2018

(30) Foreign Application Priority Data

May 22, 2017  (JP) ................................. 2017-101194

(51) Int. Cl.
| | |
|---|---|
| G06F 3/12 | (2006.01) |
| G06F 3/16 | (2006.01) |
| G06F 9/451 | (2018.01) |
| G06F 21/35 | (2013.01) |
| G06F 21/31 | (2013.01) |
| G06F 21/60 | (2013.01) |

(52) U.S. Cl.
CPC .......... *G06F 3/1222* (2013.01); *G06F 3/1204* (2013.01); *G06F 3/1238* (2013.01); *G06F 3/1253* (2013.01); *G06F 3/1292* (2013.01); *G06F 3/167* (2013.01); *G06F 9/453* (2018.02); *G06F 21/31* (2013.01); *G06F 21/35* (2013.01); *G06F 21/608* (2013.01)

(58) Field of Classification Search
None
See application file for complete search history.

(56) References Cited

U.S. PATENT DOCUMENTS

| | | | |
|---|---|---|---|
| 2013/0167215 A1* | 6/2013 | Yang ........................ | G06F 21/35 726/7 |
| 2018/0007060 A1* | 1/2018 | Leblang ................ | H04L 63/105 |

FOREIGN PATENT DOCUMENTS

| | | |
|---|---|---|
| JP | 2007-013469 | 1/2007 |
| JP | 2018-028874 | 2/2018 |
| JP | 2018-045523 | 3/2018 |
| JP | 2018-045666 | 3/2018 |

* cited by examiner

*Primary Examiner* — Andrew H Lam
(74) *Attorney, Agent, or Firm* — Oblon, McClelland, Maier & Neustadt, L.L.P.

(57) ABSTRACT

An electronic apparatus includes: an operation unit removable from the electronic apparatus that receives operation of a user; and circuitry to: obtain user information identifying the user operating the operation unit; obtain a result of authentication processing, which determines whether the user identified with the user information is an authenticated user who is allowed to use the electronic apparatus; determine whether the authenticated user requires voice assistance, based on voice assistance information that associates, for each one or more authenticated users of the electronic apparatus, requirement information indicating whether voice assistance is required for the user; based on a determination that the authenticated user requires voice assistance, perform control of outputting voice data corresponding to operation of the authenticated user received at the operation unit; and based on a determination that the authenticated user requires no voice assistance, perform no control of outputting voice data.

12 Claims, 15 Drawing Sheets

FIG. 5

| KEY (BUTTON) | KEY CODE | MESSAGE ID |
|---|---|---|
| DOUBLE-SIDED DOCUMENT | 0121 | AD0121 |
| OPENING DIRECTION | 0125 | AD0125 |
| "VERTICAL" | 0131 | AD0131 |
| "OK" | 0139 | AD0139 |
| "3" | 0013 | AD0013 |
| "START" | 0002 | AD0002 |
| ⋮ | ⋮ | ⋮ |

FIG. 6

| USER ID | REQUIREMENT INFORMATION |
|---|---|
| abcd123 | YES |
| efgh112 | NO |
| ijkl111 | NO |
| ⋮ | ⋮ |

FIG. 7

| MESSAGE ID | VOICE DATA (VOICE MESSAGE) |
|---|---|
| AD0121 | DOUBLE-SIDED DOCUMENT |
| AD0125 | OPENING DIRECTION |
| AD0131 | "VERTICAL" |
| AD0139 | "OK" |
| AD0013 | "3" |
| AD0002 | "START" |
| ⋮ | ⋮ |

FIG. 13

| USER ID | USER ATTRIBUTE |
|---|---|
| abcd123 | ... |
| efgh112 | ... |
| ijkl111 | ... |
| ⋮ | ⋮ |

ELECTRONIC APPARATUS PROVIDING VOICE ASSISTANCE BASED ON USER INFORMATION

CROSS-REFERENCE TO RELATED APPLICATIONS

This patent application is based on and claims priority pursuant to 35 U.S.C. § 119(a) to Japanese Patent Application No. 2017-101194, filed on May 22, 2017, in the Japan Patent Office, the entire disclosure of which is hereby incorporated by reference herein.

BACKGROUND

Technical Field

The present invention generally relates to an electronic apparatus, an information processing system, an information processing method, and a non-transitory recording medium.

Description of the Related Art

The electronic apparatuses shared by a plurality of users, such as a multifunctional peripheral (MFP), are recently provided with many functions, such that operation of such electronic apparatuses is rather complicated, especially, for a user who suffers from low vision.

Some electronic apparatuses are provided with a voice assistance service, which outputs voices to assist the vision impaired person, in operating the electronic apparatus such as the MFP. For example, a voice based mode and a vision based mode are switched by selection of a specific key. However, if the electronic apparatus is set to operate in the vision based mode by default, the vision impaired person still needs to operate the electronic apparatus to switch the mode without any voice assistance service.

SUMMARY

Example embodiments of the present invention include an electronic apparatus including: an operation unit removable from the electronic apparatus that receives operation of a user; and circuitry to: obtain user information identifying the user operating the operation unit; obtain a result of authentication processing, which determines whether the user identified with the user information is an authenticated user who is allowed to use the electronic apparatus; determine whether the authenticated user requires voice assistance, based on voice assistance information that associates, for each one or more authenticated users of the electronic apparatus, requirement information indicating whether voice assistance is required for the user; based on a determination that the authenticated user requires voice assistance, perform control of outputting voice data corresponding to operation of the authenticated user received at the operation unit; and based on a determination that the authenticated user requires no voice assistance, perform no control of outputting voice data.

Example embodiments of the present invention include a system including the electronic apparatus, an information processing method performed by the electronic apparatus, and a non-transitory recording medium storing an information processing control program.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 5 is an illustration of an example of first association information;

FIG. 6 is an illustration of an example of voice assistance information;

FIG. 7 is an illustration of an example of second association information;

FIG. 13 is an illustration of an example of voice assistance information;

Figure 1:
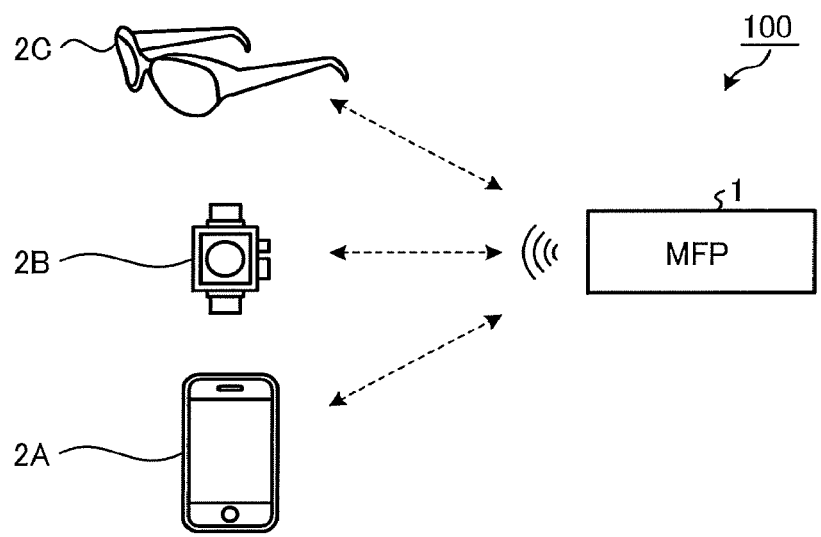
FIG. 1 is a schematic diagram illustrating a configuration of a system according to an embodiment.

The accompanying drawings are intended to depict embodiments of the present invention and should not be interpreted to limit the scope thereof The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring to the drawings, an electronic apparatus, a system, an information processing method, and a program stored in a non-transitory recording medium are described referring to one or more embodiments. In the following, a multifunctional peripheral (MFP) is described as an example of electronic apparatus. However, any electronic apparatus other than the MFP is applicable. The MFP is a device provided with at least two of a plurality of image processing functions including, for example, copy function, scan function, print function, and facsimile communication function.

FIG. 1 is a schematic diagram illustrating a configuration of a system 100 according to an embodiment. As illustrated in FIG. 1, the system 100 includes a MFP 1, and one or more mobile devices 2A to 2C (collectively referred to as the mobile device 2) each carried by an individual user. In FIG. 1, examples of the mobile device 2 include a smart phone as the mobile device 2A, a wearable device such as a watch as the mobile device 2B, and a mountable device such as glasses as the mobile device 2C. For example, the watch (mobile device 2B) may be designed to be worn around the wrist of the user. The glasses (mobile device 2C) may be designed to be worn to cover user's eyes. There may be other examples of the mobile device 2 that can be carried by the user. For the descriptive purposes, the mobile devices 2A, 2B, and 2C may be collectively referred to as the mobile device 2, unless distinction between these devices is needed. In this example, the MFP 1 and the mobile device 2 communicate with each other by near-distance wireless communication such as Wi-Fi (Registered Trademark) or Bluetooth (Registered Trademark).

Further, the mobile device 2 may be any mobile communication terminal capable of communicating with the electronic apparatus such as the MFP 1, using the near-distance wireless communication. In addition or in alternative to the smart phone and the wearable device, a tablet may be used. The smart phone is any mobile phone provided with a plurality of functions in addition to the communication function, including, for example, an image capturing function using a camera, and a Web displaying function. Lately, the smart phone is capable of providing functions that are generally provided by a personal computer (PC). The tablet is any information processing terminal, in a tablet form, capable of providing a plurality of functions similar to the functions provided by the smart phone. As described above, the wearable device is any portable device that is wearable, and implemented in the form of a watch or a pair of glasses. The wearable device, in the form of the glasses, may be referred to as smart glasses. There are many different types and forms of smart glasses. For example, the optical head-mounted display with heads-up display, or the smart glasses that look like goggles may be used.

Figure 2:
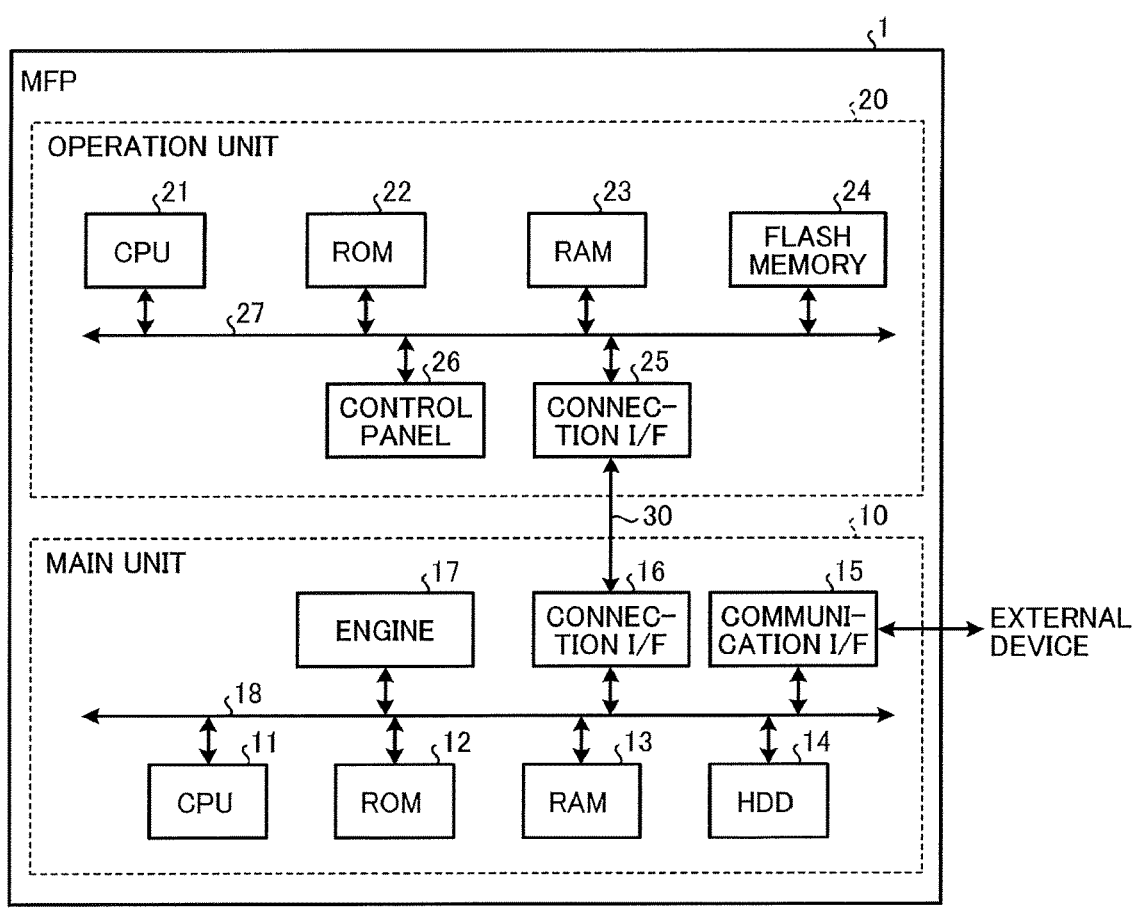
FIG. 2 is a schematic block diagram illustrating a hardware configuration of a multifunctional peripheral (MFP), according to an embodiment.

FIG. 2 is a schematic block diagram illustrating a hardware configuration of the MFP 1, according to the embodiment. The MFP 1 includes a main unit 10 provided with various functions such as copy function, scan function, facsimile communication function, and print function, and an operation unit 20 that receives user operation.

The main unit 10 and the operation unit 20 are communicably connected via a dedicated communication line (path) 30. The communication line 30 may follow the Universal Serial Standard (USB), or any other standard of wired or wireless communication. The main unit 10 may be provided with only one or more of various image processing or forming functions, such as the copy function, scan function, facsimile communication function, and print function.

The operation unit 20 may be implemented by an information processing device capable of performing information processing by itself For example, the operation unit 20 may be implemented by a smart phone or a tablet. Here, the operation unit 20 is detachably attached to the main unit 10, to operate as a control panel for controlling operation of the MFP 1. More specifically, the information processing device, as the operation unit 20, operates in cooperation with the main unit 10 to function as the MFP 1. For this reasons, it can be said that the information processing device operating as the operation unit 20, and the main unit 10, together configure one apparatus that is the MFP 1. In such case, in one example, the operation unit 20 may be configured to only provide a display function with browser software (that is, an application layer 201, a service layer 202, and an OS layer 203 are not provided). In other example, the operation unit 20 may additionally include the application layer 201. With such operation unit 20, the main unit 10 having an application layer 101, a service layer 102, and an OS layer 103, is operable according to an instruction from the operation unit 20. The information processing device operating as the operation unit 20, when removed from the main unit 10, wirelessly communicates with the main unit 10 using, for example, Bluetooth or infrared wireless communication, to instruct the main unit 10 to perform processing according to user operation.

The main unit 10 performs processing according to operation received at the operation unit 20. The main unit 10 is communicable with an external device such as a client PC, to perform processing according to an instruction received from the external device.

Next, a hardware configuration of the main unit 10 is described according to the embodiment. As illustrated in FIG. 2, the main unit 10 includes a central processing unit (CPU) 11, a read only memory (ROM) 12, a random access memory (RAM) 13, and a hard disk drive (HDD) 14. The main unit 10 further includes a communication interface (I/F) 15, a connection interface (I/F) 16, and an engine 17. The above-described elements are connected with each other through a system bus 18.

The CPU 11 controls entire operation of the main unit 10. The CPU 11 loads programs stored in the ROM 12 or HDD 14, onto the RAM 13 as a work area, to execute the programs to perform entire operation of the main unit 10. In example operation, the CPU 11 controls copying, scanning, facsimile communication, and printing.

The communication I/F 15 is an interface to communicate with an external device. For example, the communication I/F 15 may be an interface circuit for communicating with the mobile device 2 by near-distance wireless communication such as Wi-Fi or Bluetooth. The communication I/F 15 may be a network interface circuit for communicating with the external device through a network such as the Internet. The connection I/F 16 is an interface for communicating with the operation unit 20 via the communication line 30.

The engine 17 is hardware for performing various image processing such as copying, scanning, facsimile communication, and printing, or any processing other than the general-purpose information processing and communication. Specifically, the engine 17 includes a scanner that scans an original image into image data, a plotter that prints an image on a sheet material such as paper, and a facsimile communication unit that processes facsimile communication. The engine 17 may optionally include a finisher that performs finishing such as punching, stapling, or sorting the printed sheets, and an automatic document feeder (ADF) that automatically feeds the original sheets.

Next, a hardware configuration of the operation unit 20 is described according to the embodiment. As illustrated in FIG. 2, the operation unit 20 includes a CPU 21, a ROM 22, a RAM 23, a flash memory 24, a connection I/F 25, and a control panel 26, which are connected with each other through a system bus 27.

The CPU 21 controls entire operation of the operation unit 20. The CPU 21 loads programs stored in the ROM 22 onto the RAM 23 as a work area, to execute the programs to perform entire operation of the operation unit 20. The connection I/F 25 is an interface for communicating with the main unit 10 via the communication line 30.

The control panel 26 is implemented by a liquid crystal display (LCD) with a touch sensor. The control panel 26 receives various inputs of user operation, and controls display of various information such as a result of executing processing according to the user input, an operating state of the MFP 1, and a configuration of the MFP 1. The control panel 26 may be implemented by an organic electroluminescence (OEL) with a touch sensor. In addition or in alternative to the LCD or OEL, hardware keys or an alarm device such as a lamp may be provided.

Figure 3:
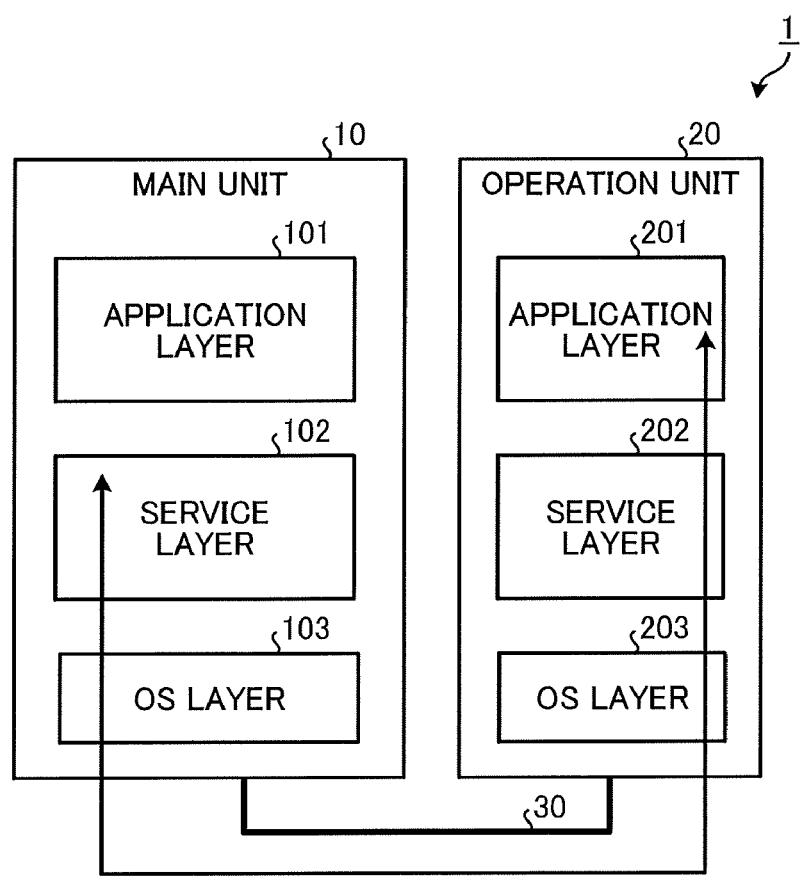
FIG. 3 is a schematic block diagram illustrating a configuration of software in the MFP of FIG. 2, according to an embodiment.

FIG. 3 illustrates an example of software configuration of the MFP 1. As illustrated in FIG. 3, the main unit 10 include the application layer 101, service layer 102, and OS layer 103. The application layer 101, service layer 102, and OS layer 103 are software stored in such as the ROM12 or the HDD 14. The CPU 11 executes software to provide various functions.

The application layer 101 is implemented by application software ("applications"), which controls hardware resources to provide various functions. Examples of such applications include, but not limited to, copy application for copying, scanner application for scanning, facsimile application for facsimile communication, and print application for printing.

The service layer 102, between the application layer 101 and the OS layer 103, is implemented by software that provides an interface for accessing hardware resources of the main unit 10. Specifically, the service layer 102 receives an operation request for hardware resources, and intermediates such operation request. Examples of the operation request received at the service layer 102 include reading with the scanner, and printing with the plotter.

The service layer 102 provides an interface function not only to the application layer 101 of the main unit 10, but also to the application layer 201 of the operation unit 20. The application layer 201 of the operation unit 20 may access hardware resources (such as the engine 17) of the main unit 10, using the interface function provided by the service layer 102.

The OS layer 103 is implemented by basic software (operating system), which provides basic functions to control hardware resources of the main unit 10. The service layer 102 converts the operation request for hardware resources, received from the application, into a command interpretable by the OS layer 103. The OS layer 103 executes the command to cause the hardware resources to perform processing according to the operation request. Similarly, the operation unit 20 includes the application layer 201, service layer 202, and OS layer 203. The application layer 201, service layer 202, and OS layer 203 of the operation unit 20 are substantially similar in function to those of the main unit 10. The functions provided by the application layer 201 and types of operation request received at the service layer 202 are, however, different from those of the main unit 10. The application layer 201 is implemented by software, which controls hardware resources of the operation unit 20 to provide various functions. More specifically, the application layer 201 provides a user interface (UI), which receives an instruction to perform functions of the main unit 10 or display results of executing such functions. As described above, the functions include, for example, copy function, scan function, facsimile communication function, and print function.

In this example, the OS layer 103 of the main unit 10 and the OS layer 203 of the operation unit 20 are different from each other. Accordingly, the main unit 10 and the operation unit 20 operate independent from each other, with different operating systems. For example, Linux (Registered Trademark) may be used as the OS layer 103 of the main unit 10, and Android (Registered Trademark) may be used as the OS layer 203 of the operation unit 20.

Since the main unit 10 and the operation unit 20 operate with different operating systems, the main unit 10 and the operation unit 20 communicate with each other as different devices, without using inter-process communication in a single device. For example, processing to transmit a user instruction received at the operation unit 20 to the main unit 10 (transfer of commands), and processing to notify the operation unit 20 of an event by the main unit 10, are performed as the main unit 10 and the operation unit 20 are separate devices. In this example, in order to use functions of the main unit 10, the operation unit 20 sends a command to the main unit 10. Examples of the event notified to the operation unit 20 by the main unit 10 include, but not limited to, an event indicating a progress of executing processing at the main unit 10, and an event indicating settings of the main unit 10, etc.

Further, in this example, the operation unit 20 is supplied with electric power from the main unit 10 via the communication line 30. Accordingly, electric power control may be performed independently on each one of the operation unit 20 and the main unit 10.

Figure 4:
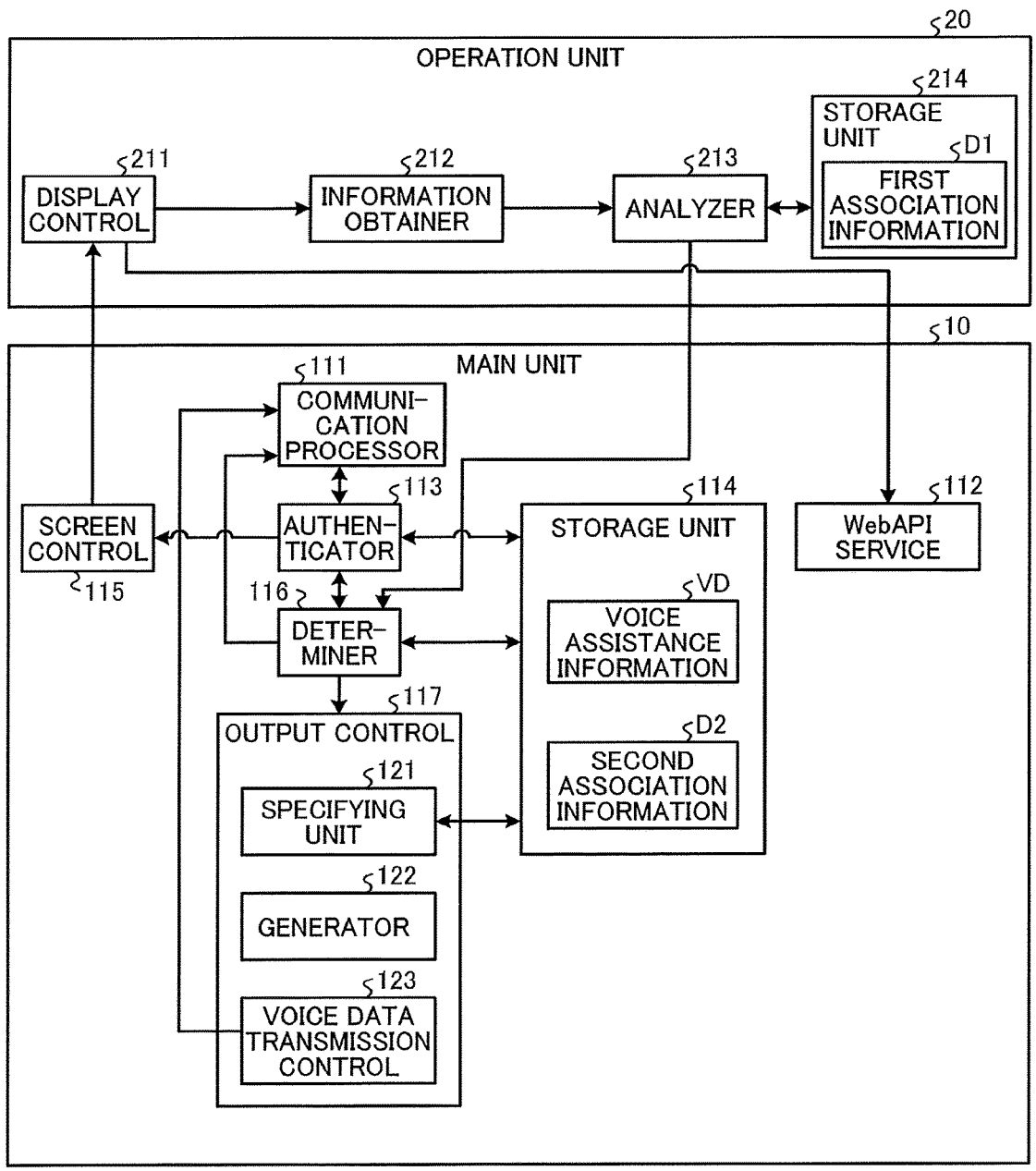
FIG. 4 is a schematic block diagram illustrating a functional configuration of the MFP of FIG. 2, according to an embodiment.

Next, a functional configuration of the MFP 1 is described according to the embodiment. FIG. 4 is a schematic block diagram illustrating a functional configuration of the MFP 1, according to the embodiment. It is to be noted that the functions provided by the MFP 1 are not limited to those described below referring to FIG. 4.

First, functions of the operation unit 20 are described. As illustrated in FIG. 4, the operation unit 20 includes a display control 211, an information obtainer 212, an analyzer 213, and a storage unit 214.

The display control 211 controls display of various screens on the control panel 26, or controls inputs of operations. For example, the display control 211 controls display of an operation screen, having a plurality of buttons or keys (examples of display components) each provided for receiving operation. The display control 211 controls the control panel 26 to display the operation screen, when a user is authenticated (that is, when the user is an authenticated user who is allowed to use the MFP 1). In this example, the display control 211 controls display of the operation screen, provided by a screen control 115 described later, on the control panel 26. For example, the operation screen is previously prepared for each of the applications on the MFP 1 (copy application, scanner application, etc.). The display control 211 controls to display an operation screen that corresponds to specific application to be used by the user, according to operation of the login user. Further, in this example, the display control 211 sends to the main unit 10 a request for executing processing according to user operation received via the operation screen.

The information obtainer 212 obtains operation information for identifying specific operation that is accepted at the operation unit 20. For example, in response to detection of pressing of any button on the operation screen, the information obtainer 212 obtains, from the display control 211, operation information identifying specific operation on the pressed button. In this example, the information obtainer 212 obtains a key code for identifying the specific button being pressed as operation information, but any other type of information may be obtained as operation information.

The analyzer 213 refers to first association information to obtain message identification information associated with the operation accepted at the operation unit 20. The first association information in this example associates, for each type of operation information identifying specific operation, message identification information identifying a message. Specifically, the analyzer 213 identifies a message identifier (example of message identification information), associated with the operation information obtained at the information obtainer 212, using the first association information. FIG. 5 is an illustration of example first association information D1. In this example, the first association information associates a name of a key (button), a key code identifying the key (example of operation information), and a message ID. However, as long as the message associated with the operation information can be identified, any other type of association information may be used. The analyzer 213 sends the message ID associated with the operation information obtained at the information obtainer 212, to a determiner 116 of the main unit 10 described later.

Referring back to FIG. 4, the storage unit 214 stores various data or information. For example, the storage unit 214 stores the first association information. The first association information may be stored in any desired memory located at any desired location. For example, the first association information may be stored at the main unit 10, or stored at any external server.

The above-described functions of the display control 211, information obtainer 212, and analyzer 213 may be achieved by executing programs stored in the ROM 22 or flash memory 24 by the CPU 21. Alternatively, any one or any part of the above-described functions may be implemented by a dedicated hardware circuit. The storage unit 214 may be implemented by, for example, the flash memory 24.

Next, functions of the main unit 10 are described. As illustrated in FIG. 4, the main unit 10 includes a communication processor 111, a Web API service 112, an authenticator 113, a storage unit 114, the screen control 115, the determiner 116, and an output control 117.

The communication processor 111 controls communication with the mobile device 2 (such as the mobile devices 2A to 2C illustrated in FIG. 1). For example, in response to reception of a connection request from the mobile device 2, the communication processor 111 establishes communication with the mobile device 2 to enable communication between the MFP 1 and the mobile device 2. In this example, the connection request includes user information identifying a user using the mobile device 2. The communication processor 111 obtains the user information from the mobile device 2 through the connection request. Further, in this example, the user information is a user ID identifying the user, but any other information may be used as the user information. For example, the user information may be a combination of a user ID and a password. The communication processor 111 sends the user information, obtained from the mobile device 2, to the authenticator 113.

In alternative to obtaining the user information through communication, the user information may be obtained using any desired method. For example, the control panel 26 may display a screen that requests the user to input user information to obtain the user information of the user. In another example, the MFP 1 may be connected to a card reader, which reads out user information stored in an IC card of the user, and sends the read user information to the MFP 1. Accordingly, the MFP 1 obtains user information from the card reader. As long as the MFP 1 is able to obtain user information identifying the user, a method for obtaining the user information is not limited to the examples described in this disclosure. the Web API service 112 receives a request from the operation unit 20, and transfers the request to specific software (function) of the main unit 10 to request for executing such request. The specific software (function) of the main unit 10, which receives the request from the Web API service 112, executes processing according to the request. For example, it is assumed that the login user, who finished using the MFP 1, requests the operation unit 20 to log out, for example, through pressing a specific key on the operation screen. In such case, the operation unit 20 sends a request for logging out the user to the Web API service 112. In response to the log out request, the Web API service 112 sends the request to the authenticator 113. The authenticator 113, which receives the log out request, performs processing to log out the user.

The authenticator 113 performs authentication processing, which determines whether the user identified with the user information is authorized to use the MFP 1. In this example, the authenticator 113 obtains the user information from the communication processor 111. The storage unit 114 stores voice assistance information, which associates, for each one of one or more users, user information of the user with requirement information indicating whether voice assistance is required for the user. More specifically, as illustrated in FIG. 6, the voice assistance information VD associates requirement information indicating whether or not voice assistance is required, for each of user IDs each identifying the user authorized to use the MFP 1. The requirement information having the value "YES" indicates that voice assistance is required, and the requirement information having the value "NO" indicates that voice assistance is not required. In alternative to the value "YES" or "NO", the requirement information may have the flag value "1" or "0". For example, the requirement information having the flag value "1" indicates that voice assistance is required, and the requirement information having the flag value "0" indicates that voice assistance is not required. Alternatively, the flag value "1" and the flag value "0" may be configured to respectively indicate that voice assistance is not required, and that voice assistance is required.

In this example, based on the user information obtained from the mobile device 2 via the communication processor 111 and the voice assistance information, the authenticator 113 determines whether the user identified with the obtained user information is authorized to use the MFP 1. Specifically, in authentication processing, the authenticator 113 searches the voice assistance information stored in the storage unit 114 to determine whether there is any user information that matches the user information obtained from the communication processor 111.

When there is the user information that matches, the authenticator 113 determines that the user identified with the user information obtained from the communication processor 111 is authorized to use the MFP 1 (authentication succeeds). In contrary, when there is no user information that matches, the authenticator 113 determines that the user identified with the user information obtained from the communication processor 111 is not authorized to use the MFP 1 (authentication fails).

When the user is authenticated based on the user information obtained from the communication processor 111, the authenticator 113 sends information indicating successful authentication to the screen control 115. The screen control 115, which receives the information indicating successful authentication, sends the operation screen to the display control 211 of the operation unit 20 to request displaying the operation screen. The display control 211, which receives the request for displaying, controls the control panel 26 to display the operation screen received from the screen control 115. Accordingly, based on successful authentication of the user, the operation screen is displayed at the operation unit 20.

When the user is authenticated using the user information obtained from the communication processor 111, the authenticator 113 sends to the determiner 116 a request for determining whether voice assistance is required for the authenticated user.

Based on the voice assistance information, the determiner 116 determines whether voice assistance is required for the user authenticated by the authenticator 113 as the user authorized to use the MFP 1. The determiner 116 refers to the voice assistance information to determine whether voice assistance is required. Specifically, when the requirement information associated with the user information, obtained from the authenticator 113, indicates "YES", the determiner 116 determines that voice assistance is required for the identified user. When the requirement information indicates "NO", the determiner 116 determines that voice assistance is not required for the identified user.

Based on a determination that voice assistance is required for the user identified with the user information obtained from the authenticator 113, the determiner 116 determines to operate the MFP 1 in a voice assistance mode in which voice data for received operation is output. The determiner 116 requests the communication processor 111 to send voice assistance operation information indicating operation in a voice assistance mode, to the mobile device 2 that has sent the user information. Accordingly, the communication processor 111 sends the voice assistance mode operation information to the mobile device 2. The mobile device 2, which receives the operation information, notifies the user that the MFP 1 operates in the voice assistance mode. When it is determined that voice assistance is not required, the determiner 116 determines to operate the MFP 1 in a normal operating mode in which voice data for received operation is not output.

In the voice assistance mode, in response to reception of a message ID from the analyzer 213 of the operation unit 20, the determiner 116 sends the message ID to the output control 117 to request output of voice data. In the normal operating mode, in response to reception of a message ID from the analyzer 213 of the operation unit 20, the determiner 116 does not send the message ID to the output control 117, such that voice data is not output.

As described above, the determiner 116 in this example determines whether voice assistance is required for the user identified with the user information received from the authenticator 113, in response to reception of the request from the authenticator 113. Alternatively, the determiner 116 may make such determination in response to reception of the message ID from the analyzer 213 of the operation unit 20. In such case, the determiner 116 sends to the authenticator 113 an inquiry about the user currently logged in, to obtain the user information of the login user from the authenticator 113. Based on the obtained user information and the voice assistance information, the determiner 116 determines whether voice assistance is required for the identified user. Based on a determination that voice assistance is required, the determiner 116 sends the message ID received from the analyzer 213 to the output control 117 to request output of voice data. Based on a determination that voice assistance is not required, the determiner 116 does not send the message ID received from the analyzer 213 to the output control 117, such that voice data is not output. In another example, functions of the authenticator 113 and the determiner 116 may be performed by either one of the authenticator 113 and the determiner 116.

When the determiner 116 determines that voice assistance is required, the output control 117 controls output of voice data corresponding to operation received at the operation unit 20. When the determiner 116 determines that voice assistance is not required, the output control 117 performs no control of output of voice data. Specifically, in one example, when the determiner 116 determines that voice assistance is required, the output control 117 sends voice data corresponding to operation received at the operation unit 20 to the mobile device 2 operated by the user, instead of outputting through the MFP 1. In another example, the output control 117 may output the voice data through the MFP 1, or any other speaker.

In this embodiment, when the output control 117 receives the message ID from the determiner 116, the output control 117 determines that voice assistance is required. In such case, the output control 117 refers to the second association information associating the message ID and the voice data, to specify the voice data associated with the message ID determined at the analyzer 213 of the operation unit 20 (the message ID received from the determiner 116), and sends the specified voice data to the mobile device 2. FIG. 7 is an illustration of example second association information D2, stored in, for example, the storage unit 114.

An example configuration of the output control 117 is described below. As illustrated in FIG. 4, the output control 117 includes a specifying unit 121, a generator 122, and a voice data transmission control 123.

When the determiner 116 determines that voice assistance is required (that is, when the message ID is received from the determiner 116), the specifying unit 121 specifies voice data corresponding to the message ID determined by the analyzer 213, by referring to the second association information. In this example, the specifying unit 121 specifies the voice data (voice message) associated with the message ID received from the determiner 116, using the second association information.

The generator 122 converts the voice data specified at the specifying unit 121 into voice data that can be output by the mobile device 2, to generate voice data for transmission to the mobile device 2.

The voice data transmission control 123 controls transmission of the voice data, generated at the generator 122, to the mobile device 2. In this example, the voice data transmission control 123 sends the voice data, generated at the generator 122, to the communication processor 111, and requests the communication processor 111 to send the voice data to the mobile device 2. The communication processor 111, which receives the request, sends the voice data received from the voice data transmission control 123 to the mobile device 2.

The above-described functions of the communication processor 111, Web API service 112, authenticator 113, screen control 115, determiner 116, and output control 117 may be achieved by executing programs stored in the ROM 12 or HDD 14 by the CPU 11. Alternatively, any one or any part of the above-described functions may be implemented by a dedicated hardware circuit. The storage unit 114 may be implemented by, for example, the HDD 14.

Figure 8:
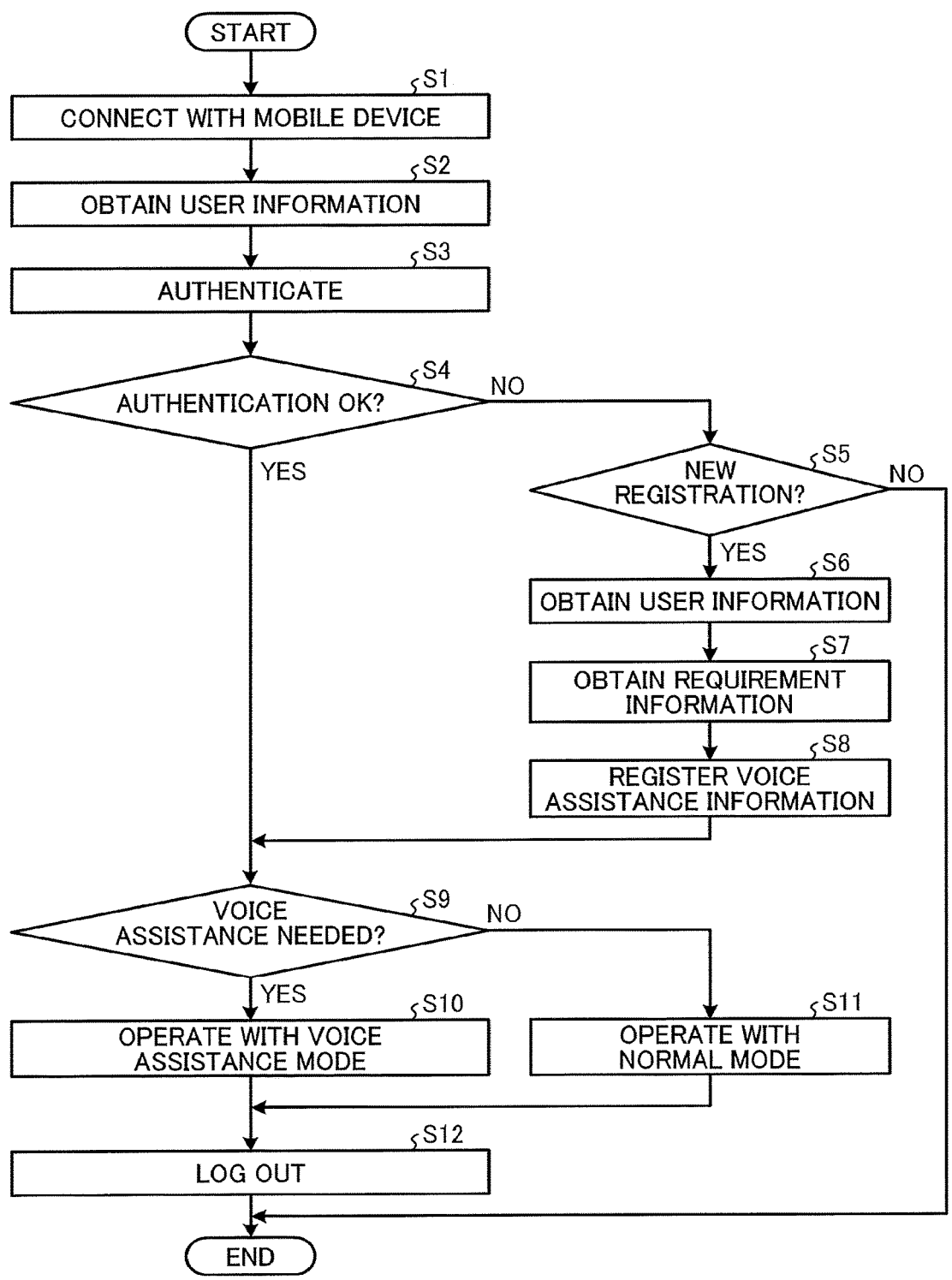
FIG. 8 is a flowchart illustrating operation of determining whether to operate in a voice assistance mode, performed by the MFP, according to an embodiment.

FIG. 8 is a flowchart illustrating operation of determining whether to operate in a voice assistance mode, for example, when the MFP 1 is activated, performed by the MFP 1, according to an embodiment. In response to reception of a connection request from the mobile device 2, the communication processor 111 establishes communication with the mobile device 2 to enable communication between the MFP 1 and the mobile device 2 (S1). The authenticator 113 obtains, from the communication processor 111, user information included in the connection request (S2). The authenticator 113 then performs authentication processing (S3), as described above.

When a result of authentication indicates that the user is not authenticated ("NO" at S4), the authenticator 113 requests the communication processor 111 to send an inquiry signal for inquiring whether to newly register to the mobile device 2. The communication processor 111, which receives the request, transmits the inquiry signal to the mobile device 2. In response to the inquiry request, the communication processor 111 receives information indicating whether to newly register or not, from the mobile device 2. When the information indicating whether to newly register, received from the mobile device 2, indicates to newly register ("YES" at S5), the authenticator 113 obtains the user information from the mobile device 2 via the communication processor 111 (S6). For example, the authenticator 113 requests the communication processor 111 to transmit a user information request that requests for user information to the mobile device 2. The communication processor 111, which receives the request, sends the user information request to the mobile device 2, and receives the user information from the mobile device 2 in response to such request. The communication processor 111 sends the user information received from the mobile device 2 to the authenticator 113. Accordingly, the authenticator 113 obtains the user information of the user. Similarly, the authenticator 113 obtains the above-described requirement information (indicating whether voice assistance is required for the user), from the mobile device 2, via the communication processor 111 (S7).

The authenticator 113 registers to the voice assistance information, the user information obtained at S6 in association with the requirement information obtained at S7 (S8). In contrary, when the information indicating whether to newly register, received from the mobile device 2 in response to the inquiry signal, indicates not to register ("NO" at S5), the operation ends.

When a result of authentication processing at S3 indicates that the user is authenticated ("YES" at S4), the operation proceeds to S9. At S9, the determiner 116 refers to the voice assistance information to determine whether voice assistance is required for the user, authenticated at the authenticator 113. As described above, when the requirement information associated with the user information obtained at S2 indicates "YES", the determiner 116 determines that voice assistance is required for the user identified with the obtained user information. When the requirement information indicates "NO", the determiner 116 determines that voice assistance is not required for the identified user.

When a determination result of S9 is "YES" ("YES" at S9), the determiner 116 determines to operate the MFP 1 in the voice assistance mode (S10). When a determination result of S9 is "NO" ("NO" at S9), the determiner 116 determines to operate the MFP 1 in the normal operating mode (S11). In response to a request for logging out from the user, logout processing is performed as described above (S12), and the operation ends. The MFP 1 then waits for connection from the mobile device 2 or any other device.

Figure 9:
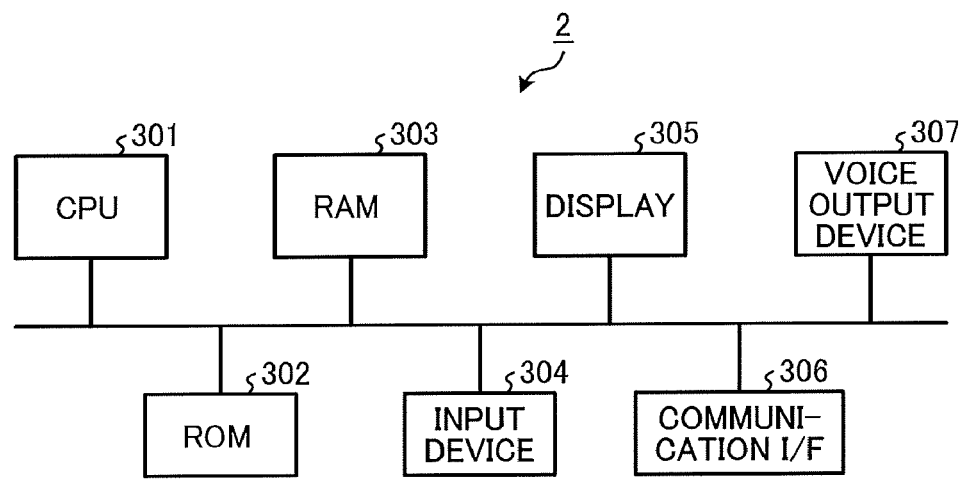
FIG. 9 is a schematic block diagram illustrating a hardware configuration of a mobile device, according to an embodiment.

FIG. 9 is a schematic diagram illustrating a hardware configuration of the mobile device 2, according to an embodiment. As illustrated in FIG. 9, the mobile device 2 includes a CPU 301, a ROM 302, a RAM 303, an input device 304, a display 305, a communication I/F 306, and a voice output device 307. The hardware of the mobile device 2 is not limited to the above, such that any other hardware may be provided in the mobile device 2 depending on a model of the mobile device 2.

The CPU 301 executes various programs to control entire operation of the mobile device 2, for example, to cause the mobile device 2 to perform various functions. The functions of the mobile device 2 are to be described later.

The ROM 302 is a non-volatile memory, which stores various programs and data. The RAM 303 is a volatile memory, which functions as a work area for the CPU 301.

The input device 304 allows the user, who also operates the mobile device 2, to input various operations. The display 305 displays various information related to the mobile device 2. The display 305 may be, for example, a liquid crystal display (LCD). For example, the input device 304 and the display 305 may be integrated into one device, such as a touch panel.

The communication I/F 306 is an interface to communicate with such as the MFP 1. The voice output device 207 is a device for outputting voices based on the voice data, such as a speaker.

Figure 10:
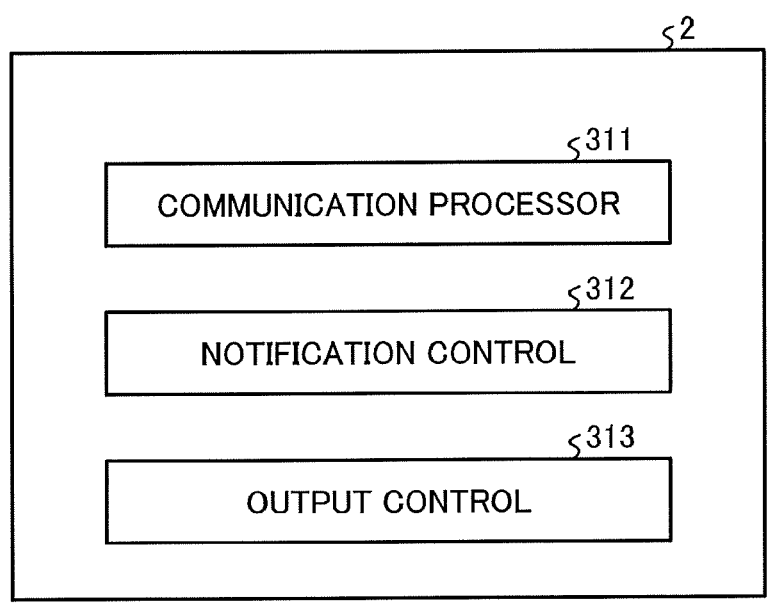
FIG. 10 is a schematic block diagram illustrating a functional configuration of the mobile device of FIG. 9, according to an embodiment.

FIG. 10 is a schematic block diagram illustrating a functional configuration of the mobile device 2, according to the embodiment. As illustrated in FIG. 10, the mobile device 2 includes a communication processor 311, a notification control 312, and an output control 313.

The communication processor 311 controls communication with an external device, such as the MFP 1. For example, the communication processor 311 transmits (broadcasts) a connection request in a predetermined area (a communicable range for the mobile device), according to a user instruction.

In response to reception of the operation information indicating the voice assistance mode, from the MFP 1, the notification control 312 notifies the user that the MFP 1 operates in the voice assistance mode. While the notification to the user may be performed in various ways, it is desirable to output the notification in the form of voices.

The output control 313 controls the voice output device 307 to output voices based on the voice data received from the MFP 1.

Figure 11:
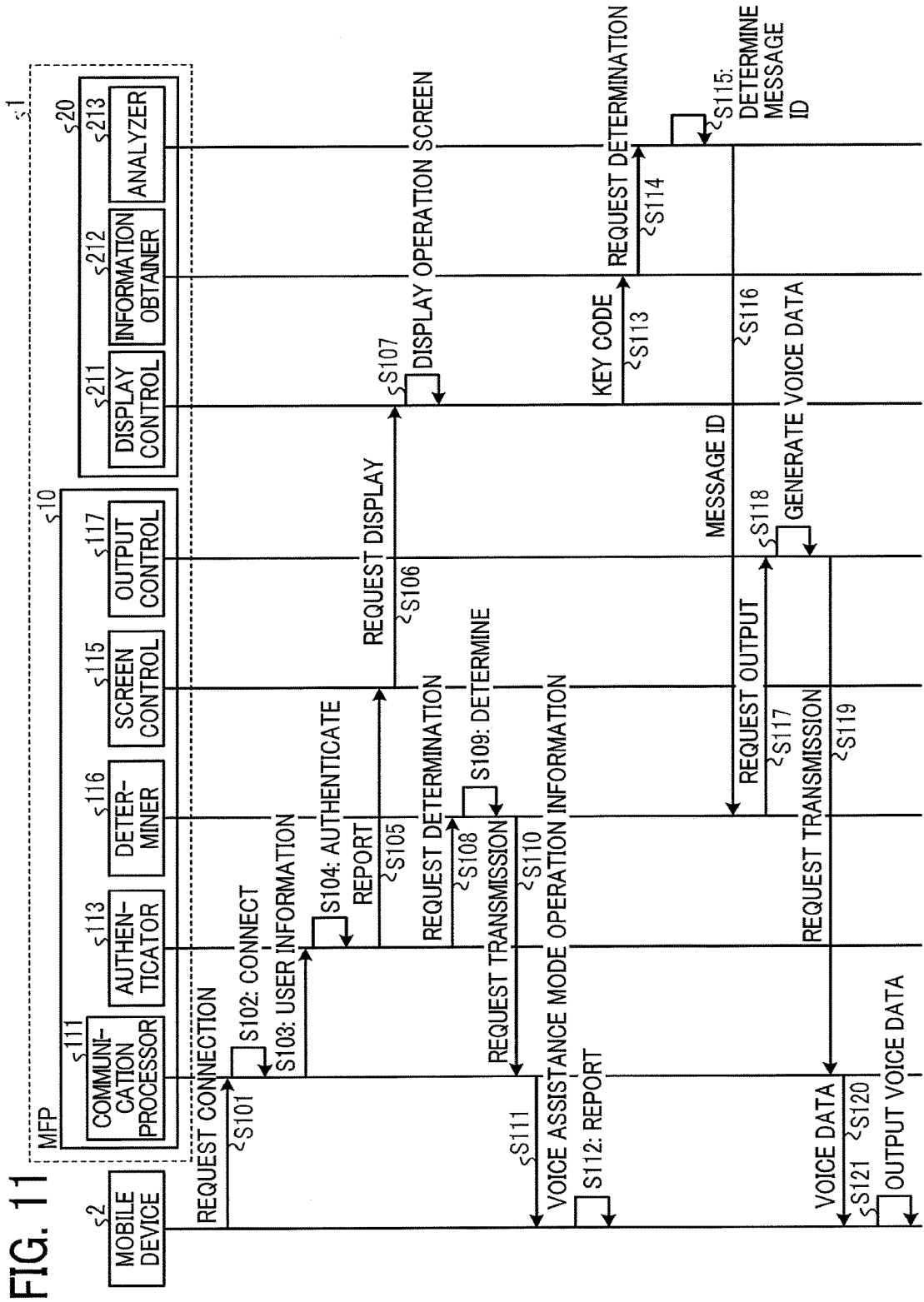
FIG. 11 is a data sequence diagram illustrating operation of determining whether to operate in a voice assistance mode, performed by the system of FIG. 1, according to an embodiment.

FIG. 11 is a data sequence diagram illustrating operation of determining whether to operate in a voice assistance mode, performed by the system 100, when the MFP 1 is communicably connected with the mobile device 2. The communication processor 311 of the mobile device 2 transmits a connection request (S101). In response to reception of the connection request from the mobile device 2, the communication processor 111 of the MFP 1 establishes communication with the mobile device 2 to enable communication between the MFP 1 and the mobile device 2 (S102). The communication processor 111 sends user information included in the connection request, to the authenticator 113 (S103).

The authenticator 113 performs authentication processing, which determines whether the user identified with the user information is authorized to use the MFP 1, based on the user information obtained from the communication processor 111. The following assumes that a result of authentication processing indicates that the user is authenticated as the user authorized to use the MFP 1. In such case, the authenticator 113 sends a notification indicating that the user is authenticated, to the screen control 115 (S105). The screen control 115, which receives the information indicating successful authentication, sends the operation screen to the display control 211 of the operation unit 20 to request displaying the operation screen (S106). The display control 211, which receives the request for displaying, controls the control panel 26 to display the operation screen received from the screen control 115 (S107).

The authenticator 113 sends the user information to the determiner 116 to request for determining whether voice assistance is required for the user (S108). The determiner 116, which receives the request, refers to the voice assistance information to determine whether the requirement information associated with the user information of the user, obtained from the authenticator 113 indicates "YES" (S109). The following assumes that the requirement information associated with the user information obtained from the authenticator 113 is "YES". The determiner 116 determines to operate the MFP 1 in the voice assistance mode, and requests the communication processor 111 to send voice assistance operation information indicating operation in the voice assistance mode to the mobile device 2 (S110). The communication processor 111, which receives the request, sends the voice assistance operation information to the mobile device 2 (S111). The notification control 312 of the mobile device 2, which receives the operation information, notifies the user that the MFP 1 operates in the voice assistance mode (S112).

In the following example, it is assumed that the display control 211 of the operation unit 20 receives selection of any button on the operation screen, while the MFP 1 operates in the voice assistance mode. In such case, the display control 211 transmits the key code of the selected (pressed) button to the information obtainer 212 (S113). The information obtainer 212 sends the key code obtained from the display control 211, to the analyzer 213, to request for determining a message ID for the selected key code (S114). The analyzer 213, which receives the request, determines a message ID corresponding to the key code received from the information obtainer 212, using the first association information (S115). The analyzer 213 then sends the determined message ID to the determiner 116 of the main unit 10 (S116).

The determiner 116, which receives the message ID from the analyzer 213, requests the output control 117 to output voice data based on the message ID (S117). The output control 117, which receives the request, generates voice data corresponding to the message ID received from the determiner 116 (S118). The output control 117 requests the communication processor 111 to send the voice data that is generated to the mobile device 2 (S119). The communication processor 111 sends the voice data to the mobile device 2 (S120). The output control 313 of the mobile device 2 controls the voice output device 307 to output voices based on the voice data received from the MFP 1 (S121).

As described above, the MFP 1 determines whether voice assistance is required for the authenticated user (login user), using voice assistance information associating, for each one or more users, user information identifying the user with requirement information indicating whether voice assistance is required for the user. Based on a determination that voice assistance is required for the authenticated user, the MFP 1 determines to operate in a voice assistance mode, and controls output of voice data corresponding to operation received at the operation unit 20. Based on a determination that voice assistance is not required, the MFP 1 determines to operate in the normal operating mode, such that no control of voice data is performed. Accordingly, the MFP 1 automatically switches between the voice assistance mode and the normal operating mode, without requiring intervention of the login user, thus improving user operability.

That is, the electronic apparatuses shared by a plurality of users, such as a multifunctional peripheral (MFP), are mostly provided with a user authentication function to prevent unauthorized use or to restrict use based on the authentication result. For example, in order to use the MFP, the user inputs authentication information, such as a user ID and a password, to log into a system. When the user finishes using the MFP, the user logs out from the system. The MFP according to the above-described embodiment, uses a result of user authentication to determine whether the login user requires a voice assistance service. Since the MFP automatically operates in the normal operating mode or the voice assistance mode, based on information of the login user, the user feels more comfortable with operating the MFP.

Further, when the MFP 1 determines that voice assistance is required for the login user, the MFP 1 sends voice data corresponding to operation received at the operation unit 20 to the mobile device 2 operated by the user, instead of outputting through the MFP 1.

For example, when the voice data is output through the MFP 1, the user may feel reluctant using the voice assistance service, especially, when the MFP 1 is provided in a quiet place. Further, the voices output through the MFP 1 may be heard by the third person. The user may feel reluctant to use the voice assistance service, especially when the user deals with confidential information that requires high level of security.

Since the MFP 1 sends voice data corresponding to operation received at the operation unit 20 to the mobile device 2 operated by the user, instead of outputting through the MFP 1, voices are output from the mobile device 2 operated by the user. Accordingly, the third person can hardly hear the voices output from the mobile device 2, compared to the case in which the voices are output from the MFP 1. For example, the user is able to connect an ear phone to the mobile device 2. In this way, the user feels more comfortable using the voice assistance service in the public place, even when the MFP 1 is provided in a quiet place or in a place where the third person can easily hear.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

For example, the above-described MFP 1 is just one example of an electronic apparatus capable of providing the voice assistance service. Other examples of such electronic apparatus include, but not limited to, a projector, teleconference or videoconference system, digital camera, etc., each of which performs user authentication to identifying a user before the user uses the device. In such case, various functions of the main unit 10 specific to the MFP 1 (such as various image processing and forming functions of copying, scanning, facsimile transmission) are not to be provided, depending on specific function of each electronic apparatus. Accordingly, hardware of each electronic apparatus depends on specific function of the electronic apparatus. For example, in case the electronic apparatus is a projector, the projector includes devices for projecting, such as a projection lens. In case the electronic apparatus is an electronic whiteboard, the electronic whiteboard includes devices for displaying an image, such as an electronic board. Further, the engine 17 of the MFP 1 is replaced by hardware specific to each electronic apparatus.

In another example, the above-described embodiment may be performed in various other ways as described below.

Figure 12:
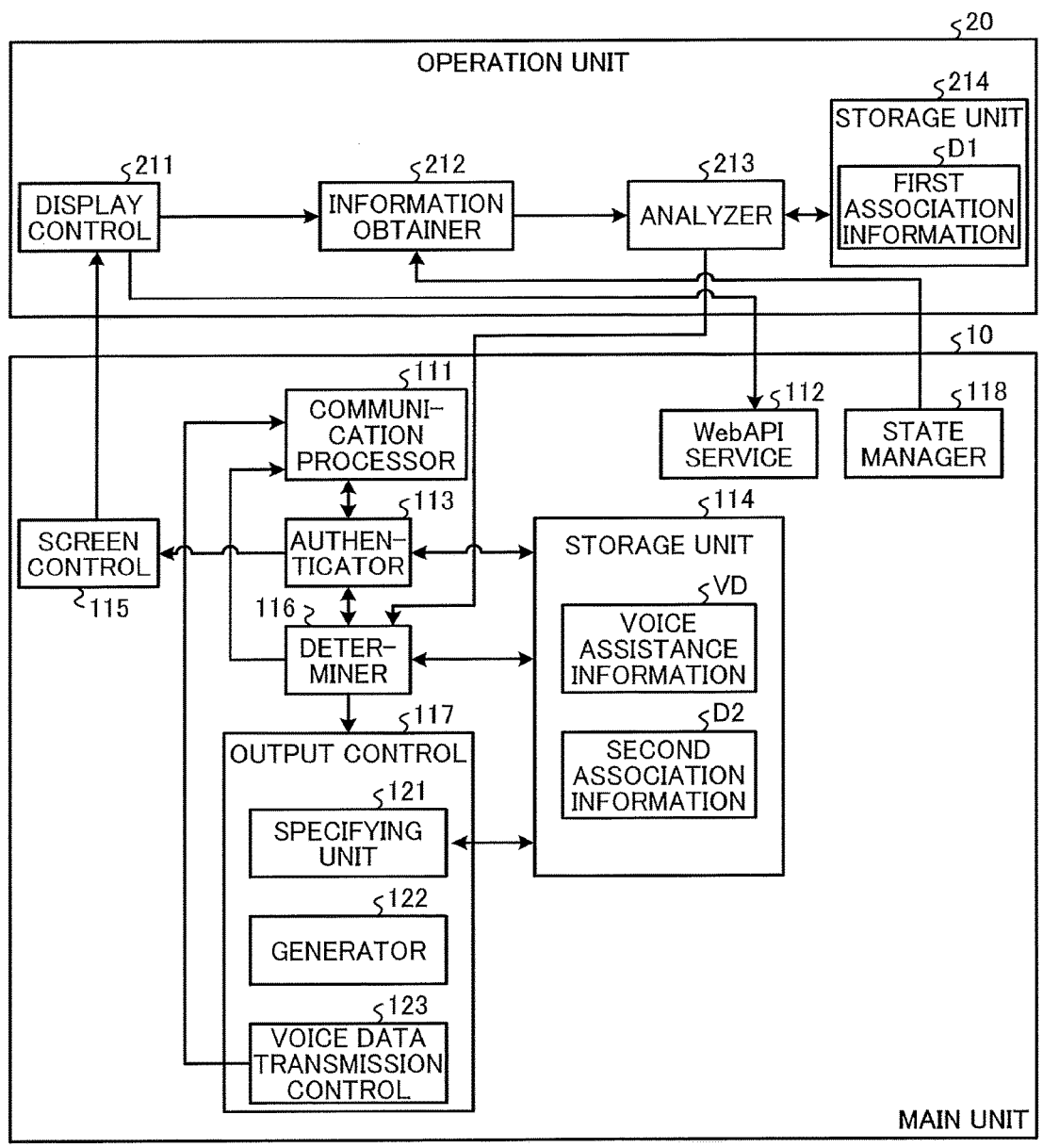
FIG. 12 is a schematic block diagram illustrating a functional configuration of the MFP, according to a modified example.

According to one modified example, the first association information may associate a message ID, with operation information for identifying specific operation, and state information indicating a specific operating state of the MFP 1. For example, as illustrated in FIG. 12, the main unit 10 further includes a state manager 118 that manages an operating state of the MFP 1. The state manager 118 may send state information indicating a current operating state of the MFP 1, every time the operating state changes or every predetermined time. The information obtainer 212 of the operation unit 20 is further provided with a function of obtaining the state information transmitted from the main unit 10. The analyzer 213 refers to the first association information to determine a message ID, associated with the operation information or the state information that is obtained at the information obtainer 212. In the voice assistance mode, the output control 117 controls output of voice data corresponding to the operation received at the operation unit 20 or the state of the main unit 10.

For example, when the current operating state of the MFP 1 indicates that the MFP 1 transitions from a sleep mode to a normal operating mode, the message ID identifying a message indicating such mode transition is obtained. In another example, when the current operating state of the MFP 1 indicates that printing is started, the message ID identifying a message indicating start of printing is obtained. In another example, when the operating state of the MFP 1 indicates detection of a paper jam, the message ID identifying a message indicating detection of a jam is obtained. In another example, when the operating state of the MFP 1 indicates that the MFP 1 is out of paper, the message ID identifying a message indicating that the MFP 1 is out of paper is obtained. In another example, when the operating state of the MFP 1 indicates that printing is completed, the message ID identifying a message indicating end of printing is obtained.

In other modified example, the voice assistance information may associate, for each user, the user ID with a user attribute. The user attribute is any information regarding attributes of the user, which helps to determine whether the user requires voice assistance services, such as whether the user has visual impairments. In this example, the user attribute is any information that indicates whether voice assistance is required. For instance, the user attribute may by any term that indicates a type of eye diseases, eye disorders, eye injuries, or birth defects. In other example, the user attribute may be any information regarding the user, which can be obtained from settings at the mobile device 2 of the user. For example, the mobile device 2 has settings related to hearing aid. Such information may be registered as the user attribute, together with the user ID. In operation, the determiner 116 refers to voice assistance information to determine whether the user attribute, in the user information received from the authenticator 113, includes any keyword that implies the visual impaired user. Based on this determination, the determiner 116 determines whether voice assistance is required for the login user.

Figure 14:
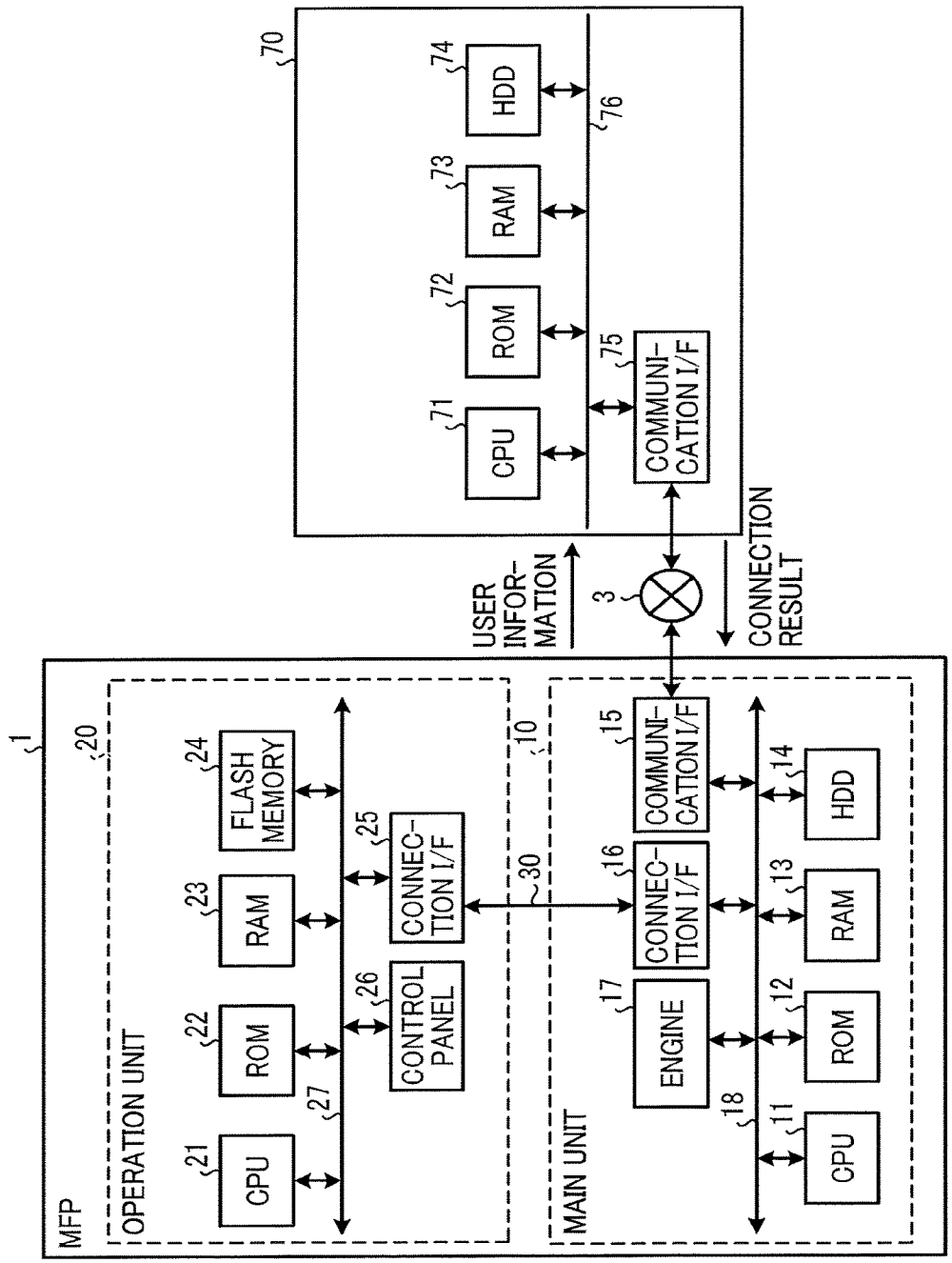
FIG. 14 is a schematic block diagram illustrating a hardware configuration of the system, according to a modified example.

In another modified example, as illustrated in FIG. 14, user authentication may be performed at an authentication server 70 provided on a network 3. Referring to FIG. 14, the authentication server 70 includes a CPU 71, a ROM 72, a RAM 73, a HDD 74, and a communication I/F 75, which are connected with each other through a bus line 76. The HDD 74 stores user network information identifying each user of one or more users authorized to use the MFP 1. The communication OF 75 allows communication of data with an external device through the communication network 3 such as the Internet. In this modified example, the CPU 71 executes programs stored in such as the ROM 72 to perform functions of the authenticator 113 described above. That is, the authentication server 70 operates as the authenticator 113. In this example, the MFP 1 and the authentication server 70 are included in the system. Further, the communication I/F 15 of the main unit 10 of the MFP 1 functions as an interface that connects with the network 3.

In operation, the MFP 1 transmits user information obtained from the mobile device 2 to the authentication server 70. The authentication server 70 performs authentication processing, which determines whether user information stored in the HDD 74 includes any user information that matches user information obtained from the MFP 1, to output a result of authentication processing to the MFP 1. When a result of authentication processing indicates that the user is authenticated, the screen control 115 controls the control panel 26 to display the above-described operation screen. The determiner 116 determines whether the authenticated user requires voice assistance. When authentication is successful, the authentication server 70 sends, together with the result of authentication processing, user information identifying the authenticated user to the MFP 1.

In this modified example, since user authentication is performed at the authentication server 70, loads on the MFP 1 are reduced. While the authentication server 70 in FIG. 14 is a single device, authentication processing may be performed by a plurality of servers that are distributed over the network.

Figure 15:
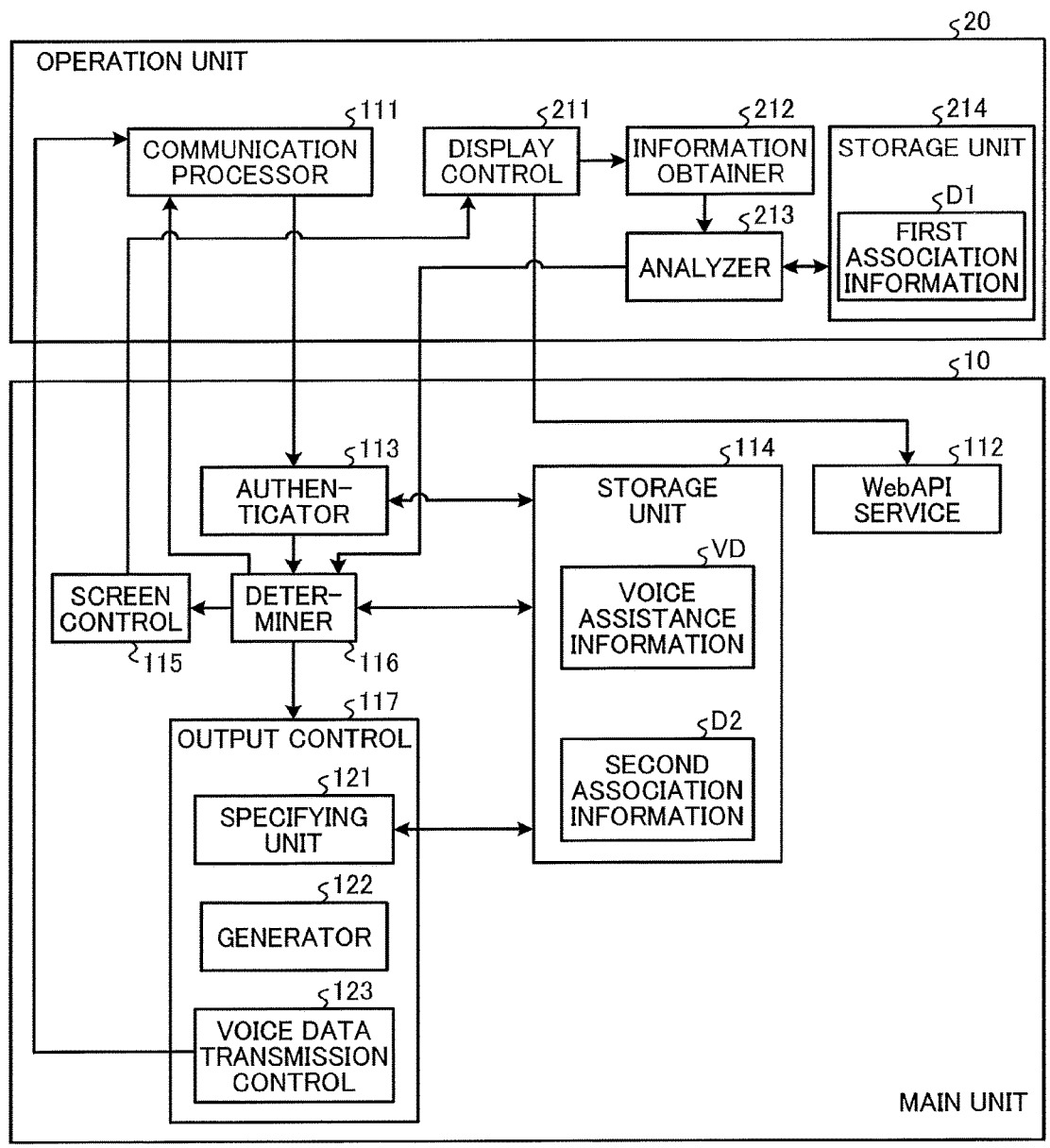
FIG. 15 is a schematic block diagram illustrating a functional configuration of the MFP, according to a modified example.

In other modified example, the operation unit 20 may be provided with a function of communicating with the mobile device 2, using near-distance wireless communication such as Wi-Fi or Bluetooth. For example, as illustrated in FIG. 15, the communication processor 111 described above may be provided at the operation unit 20. In such case, communication between the mobile device 2 and the MFP 1 is performed by the communication processor 111 of the operation unit 20, thus reducing processing loads on the main unit 10.

Figure 16:
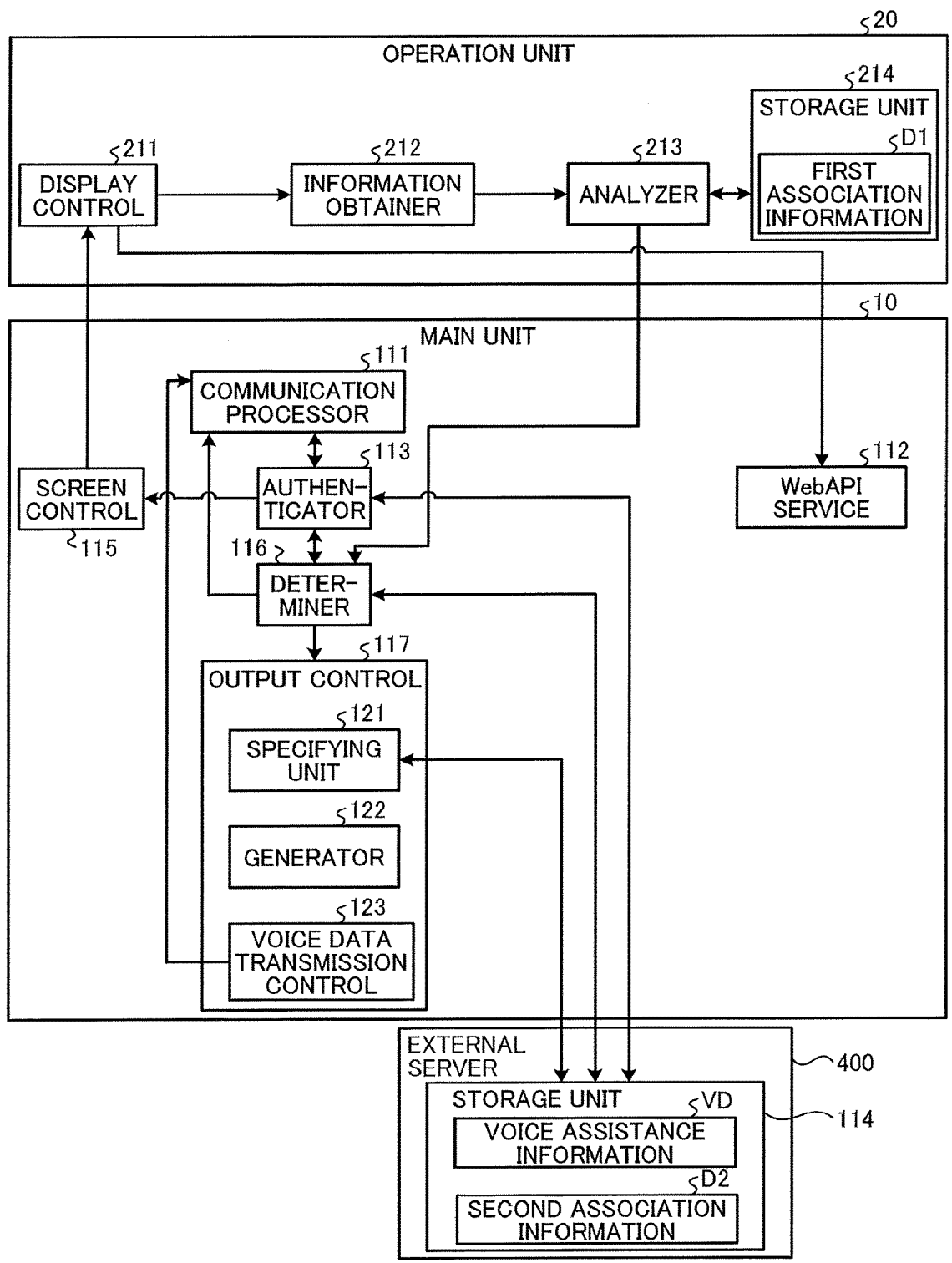
FIG. 16 is a schematic block diagram illustrating a functional configuration of the system, according to a modified example.
Figure 17:
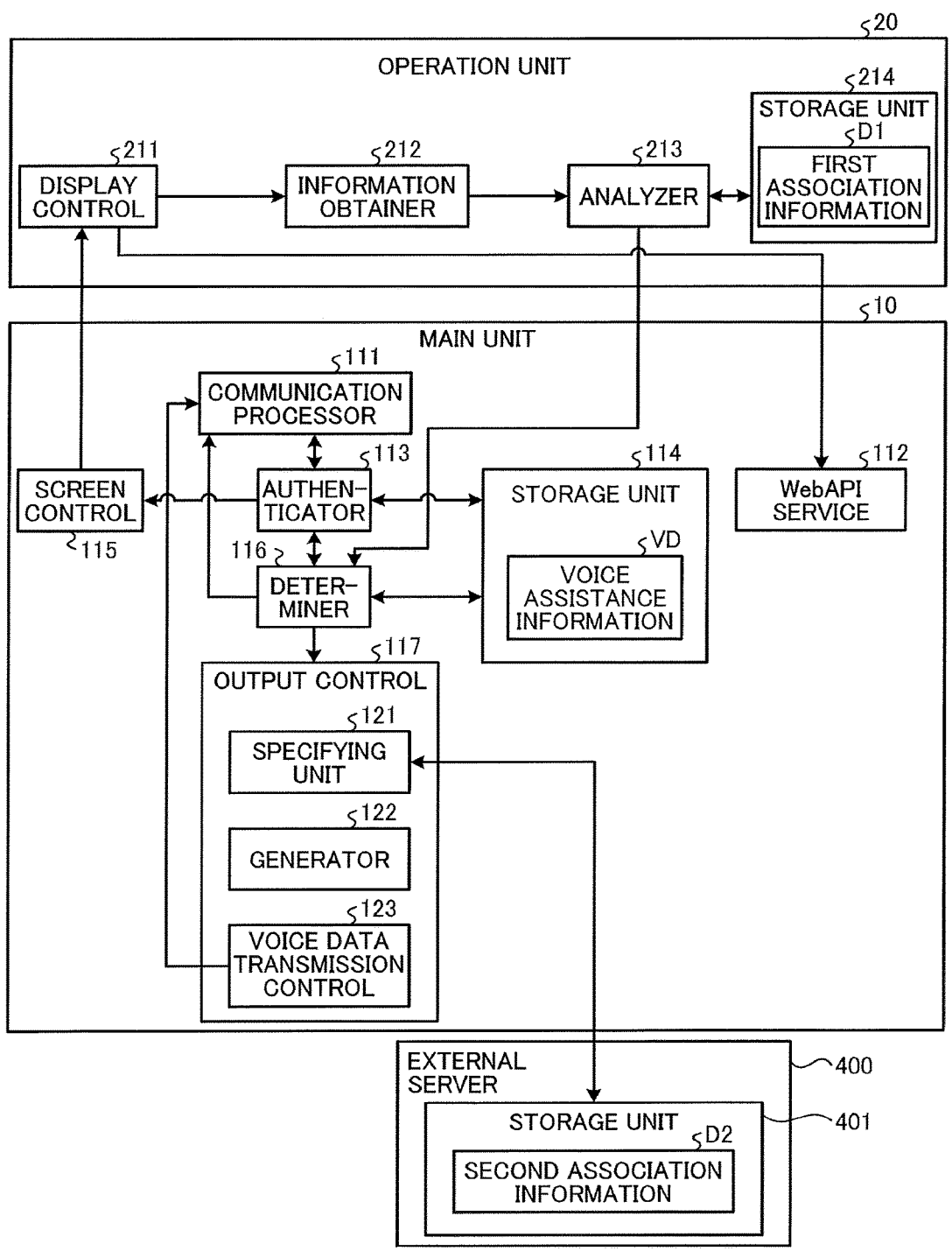
FIG. 17 is a schematic block diagram illustrating a functional configuration of the system, according to a modified example.

In other modified example, as illustrated in FIG. 16, the storage unit 114 that stores the voice assistance information or second association information, may be provided at an external server 400. In another example, as illustrated in FIG. 17, the storage unit 114 that stores the voice assistance information may be provided at the main unit 10, and the storage unit 401 that stores the second association information may be provided at the external server 400. In another example, the storage unit 114 that stores the second association information may be provided at the main unit 10, and the storage unit 401 that stores the voice assistance information may be provided at the external server 400. That is, any one of the voice association information and the second association information may be stored in any desired storage area.

In other modified example, the operation unit 20 may be replaced with a mobile device 2 of the user. For example, the mobile device 2 may be previously installed with at least software capable of displaying a screen, displayed by the operation unit 20.

While the main unit 10 and the operation unit 20 operate independently from each other, with different operating systems, the main unit 10 and the operation unit 20 may be incorporated into a single housing and operate under control of the same operating system.

Any one of programs for execution by the system 100 may be stored in any computer-readable recording medium, such as a CD-ROM, floppy disk (FD), CD-R, or DVD, in a file format installable and executable by the computer, for distribution. Alternatively, any one of such programs may be downloaded from any device via a network such as the Internet for distribution. Alternatively, any one of such programs may be previously stored in a non-volatile memory such as a ROM of any apparatus such as the MFP 1.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An electronic apparatus, comprising:
an operation unit removable from the electronic apparatus and configured to receive operation of a user; and
circuitry configured to:
   obtain user information identifying the user operating the operation unit;
   obtain a result of authentication processing, which determines whether the user identified with the user information is an authenticated user who is allowed to use the electronic apparatus;
   determine whether the authenticated user requires voice assistance, based on the user information and voice assistance information that associates, for identification information of each user of one or more users of the electronic apparatus, requirement information indicating whether or not voice assistance is required for the user;
   when determining, based on the voice assistance information, that the authenticated user requires voice assistance, perform control of outputting voice data corresponding to operation of the authenticated user received at the operation unit; and
   when determining, based on the voice assistance information, that the authenticated user requires no voice assistance, perform no control of outputting voice data.

2. The electronic apparatus of claim 1,
wherein, based on the determination that the authenticated user requires voice assistance, the circuitry is further configured to transmit the voice data corresponding to the operation of the authenticated user to a mobile device operated by the authenticated user for output through the mobile device, while controlling the electronic apparatus not to output the voice data.

3. The electronic apparatus of claim 2, wherein, based on the determination that the authenticated user requires voice assistance, the circuitry is further configured to:
determine a message identifier identifying a message to be output in response to reception of the operation of the authenticated user, based on first association information, the first association information associating, for each one or more operations to be performed at the operation unit, an operation identifier identifying the operation and a message identifier identifying a message to be output; and
identify the voice data corresponding to the operation of the authenticated user, based on the determined message identifier and second association information for transmission to the mobile device, the second association information associating, for each of one or more message identifiers, voice data indicating a message to be output.

4. The electronic apparatus of claim 3, wherein, based on the determination that the authenticated user requires voice assistance, the circuitry is further configured to:
obtain the voice data corresponding to the determined message identifier, based on the second association information; and
convert the obtained voice data into voice data in a format compatible with the mobile device for transmission to the mobile device.

5. The electronic apparatus of claim 3,
wherein the operation unit is further configured to control display of an operation screen including a plurality of display components each selectable by the user,
wherein, in response to selection of any one of the plurality of display components, the operation unit receives an operation corresponding to the selected display component, as the operation of the authenticated user.

6. The electronic apparatus of claim 1, wherein the circuitry is further configured to perform the authentication processing, which determines whether the user identified with the user information is the authenticated user, based on the user information and the voice assistance information.

7. A system, comprising:
the electronic apparatus of claim 3; and
a memory to store at least one of the first association information, the voice assistance information, and the second association information.

8. The system of claim 7, further comprising:
an authentication server configured to perform the authentication processing, which determines whether the user identified with the user information is the authenticated user based on the user information and the voice assistance information.

9. The electronic apparatus of claim 1, wherein the circuitry is further configured to determine whether the authenticated user requires the voice assistance by using only the user information of the authenticated user.

10. The electronic apparatus of claim 1, wherein the circuitry is further configured to determine whether the user requires voice assistance without receiving voice input from the user.

11. An information processing method, performed by an electronic apparatus provided with an operation unit removable from the electronic apparatus, the method comprising:
obtaining user information identifying a user operating the operation unit;
obtaining a result of authentication processing, which determines whether the user identified with the user information is an authenticated user who is allowed to use the electronic apparatus; and determining whether the authenticated user requires voice assistance, based on the user information and voice assistance information that associates, for identification information of each user of one or more users, requirement information indicating whether or not voice assistance is required for the user, wherein, when determining, based on the voice assistance information, that the authenticated user requires voice assistance, the method further comprises performing control of outputting voice data corresponding to operation of the authenticated user received at the operation unit, and wherein, when determining, based on the voice assistance information, that the authenticated user requires no voice assistance, the method further comprises performing no control of outputting voice data.

12. A non-transitory recording medium which, when executed by one or more processors on an electronic apparatus provided with an operation unit removable from the electronic apparatus, cause the processors to perform an information processing method comprising:

obtaining user information identifying a user operating the operation unit;

obtaining a result of authentication processing, which determines whether the user identified with the user information is an authenticated user who is allowed to use the electronic apparatus; and determining whether the authenticated user requires voice assistance, based on the user information and voice assistance information that associates, for identification information of each user of one or more authenticated users, requirement information indicating whether or not voice assistance is required for the user, wherein, when determining, based on the voice assistance information, that the authenticated user requires voice assistance, the method further comprises performing control of outputting voice data corresponding to operation of the authenticated user received at the operation unit, and wherein, when determining, based on the voice assistance information, that the authenticated user requires no voice assistance, the method further comprises performing no control of outputting voice data.

* * * * *